(12) United States Patent
Smyth et al.

(10) Patent No.: US 11,531,080 B2
(45) Date of Patent: Dec. 20, 2022

(54) LEVERAGING SPECTRAL DIVERSITY FOR MACHINE LEARNING-BASED ESTIMATION OF RADIO FREQUENCY SIGNAL PARAMETERS

(71) Applicant: Cypress Semiconductor Corporation, San Jose, CA (US)

(72) Inventors: Aidan Smyth, Milpitas, CA (US); Victor Simileysky, San Jose, CA (US); Kiran Uln, Pleasanton, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 572 days.

(21) Appl. No.: 16/584,545

(22) Filed: Sep. 26, 2019

(65) Prior Publication Data

US 2021/0025962 A1 Jan. 28, 2021

Related U.S. Application Data

(60) Provisional application No. 62/878,192, filed on Jul. 24, 2019.

(51) Int. Cl.
*G01S 3/48* (2006.01)
*G01S 3/74* (2006.01)
(Continued)

(52) U.S. Cl.
CPC ....... *G01S 3/48* (2013.01); *G01S 3/74* (2013.01); *G01S 11/06* (2013.01); *G06N 20/00* (2019.01);
(Continued)

(58) Field of Classification Search
CPC ... G01S 3/48; G01S 3/74; G01S 11/06; H04B 17/327; H04B 7/0413; H04B 7/0691; H04B 7/0697; G06N 20/00
(Continued)

(56) References Cited

U.S. PATENT DOCUMENTS 7,555,395 B2 * 6/2009 Willis ............. G03F 7/70516
702/81
7,855,681 B2 * 12/2010 Minear ............. H04B 7/086
342/368
(Continued)

FOREIGN PATENT DOCUMENTS

KR 101971801 B1 4/2019
WO WO-2004060010 A1 * 7/2004 ........... H04W 64/00
(Continued)

OTHER PUBLICATIONS

International Search Report for International application No. PCT/US20/42008 dated Oct. 9, 2020, 2 pages.
(Continued)

*Primary Examiner* — Bernarr E Gregory
*Assistant Examiner* — Nuzhat Pervin

(57) ABSTRACT

An example method for estimating the angle-of-arrival (AoA) and other parameters of radio frequency (RF) signals that are received by an antenna array comprises: receiving a plurality of radio frequency (RF) signal power measurements by a plurality of antenna elements at a plurality of RF channels; computing, by applying a machine learning model to the plurality of RF signal power measurements, an estimated RF signal parameter value; and outputting the RF signal parameter value.

19 Claims, 10 Drawing Sheets

(51) Int. Cl.
*H04B 7/06* (2006.01)
*G01S 11/06* (2006.01)
*H04B 7/0413* (2017.01)
*H04B 17/327* (2015.01)
*G06N 20/00* (2019.01)

(52) U.S. Cl.
CPC ......... *H04B 7/0413* (2013.01); *H04B 7/0691* (2013.01); *H04B 7/0697* (2013.01); *H04B 17/327* (2015.01)

(58) Field of Classification Search
USPC ........................................................ 342/442
See application file for complete search history.

(56) References Cited

U.S. PATENT DOCUMENTS

| | | | | |
|---|---|---|---|---|
| 7,970,365 | B2* | 6/2011 | Martin | H04B 7/0848 455/272 |
| 8,184,656 | B2* | 5/2012 | Chandra | H04B 7/02 370/282 |
| 8,670,390 | B2* | 3/2014 | Shattil | H04L 27/26526 455/452.2 |
| 8,730,110 | B2* | 5/2014 | Rao | H01Q 9/0421 343/893 |
| 8,929,936 | B2* | 1/2015 | Mody | H04W 48/02 455/450 |
| 8,942,659 | B2* | 1/2015 | Gulati | H01Q 1/007 455/562.1 |
| 9,209,871 | B2 | 12/2015 | Agee et al. | |
| 9,577,346 | B2* | 2/2017 | Shtrom | H01Q 9/16 |
| 9,716,308 | B2* | 7/2017 | Mital | H01Q 1/34 |
| 9,941,959 | B2 | 4/2018 | Heath et al. | |
| 10,129,929 | B2* | 11/2018 | Matsumori | H04W 88/06 |
| 2007/0287385 | A1* | 12/2007 | Stephenne | H04B 7/08 455/562.1 |
| 2010/0123624 | A1* | 5/2010 | Minear | H04B 7/084 342/372 |
| 2010/0124895 | A1* | 5/2010 | Martin | H01Q 1/246 455/276.1 |
| 2011/0148578 | A1* | 6/2011 | Aloi et al. | G01S 3/54 340/8.1 |
| 2016/0110657 | A1* | 4/2016 | Gibiansky | G06N 20/00 706/12 |
| 2016/0226653 | A1* | 8/2016 | Bharadia | H04B 1/525 |
| 2017/0110804 | A1 | 4/2017 | Henry et al. | |
| 2018/0365975 | A1 | 12/2018 | Xu et al. | |
| 2018/0367192 | A1* | 12/2018 | O'Shea | G06N 3/0445 |
| 2019/0057174 | A1* | 2/2019 | Hashimoto | G06N 20/00 |
| 2019/0182627 | A1 | 6/2019 | Thoresen et al. | |
| 2019/0327124 | A1* | 10/2019 | Lai | H04B 1/38 |
| 2020/0202168 | A1* | 6/2020 | Mao | G05D 1/0221 |

FOREIGN PATENT DOCUMENTS

| | | | | |
|---|---|---|---|---|
| WO | 2017147662 A1 | 9/2017 | | |
| WO | WO-2017147662 A1 * | 9/2017 | ............... | H04B 7/04 |

OTHER PUBLICATIONS

Written Opinion of the International Searching Authority for International application No. PCT/US20/42008 dated Oct. 9, 2020, 6 pages.

Ding, Enjie, et al., A Robust Passive Intrusion Detection System with Commodity WiFi Devices, Hindawi, Journal of Sensors, vol. 2018, Article ID 8243905, 12 pages.

* cited by examiner

LEVERAGING SPECTRAL DIVERSITY FOR MACHINE LEARNING-BASED ESTIMATION OF RADIO FREQUENCY SIGNAL PARAMETERS

RELATED APPLICATIONS

This application claims the benefit of U.S. Provisional Application No. 62/878,192, filed Jul. 24, 2019, the entire contents of which are incorporated by reference.

BACKGROUND

Accurate estimation of the angle of arrival (AoA) and/or other parameters of radio frequency (RF) signals may be desired for performing various tasks, such as source tracking, which involves determining the location of the transmitter with respect to the receiving antenna array. In certain implementations, source tracking may be performed based on several measurements of AoA obtained by one or more receiving devices.

BRIEF DESCRIPTION OF THE DRAWINGS

The present disclosure is illustrated by way of example, and not of limitation, in the figures of the accompanying drawings in which.

DETAILED DESCRIPTION

The embodiments described herein are directed to systems and methods for estimating the angle-of-arrival (AoA) and other parameters of radio frequency (RF) signals that are received by an antenna array. Such parameters may include the line-of-sight (LoS) angle of arrival, reflection AoA, attenuation of reflection, relative delay of reflection, relative phase, and/or other parameters. In an illustrative example, the estimated AoA and/or other parameters may be used for source tracking, i.e., determining the location of the transmitter with respect to the receiving antenna array. In an illustrative example, the transmitter position may be estimated based on three AoA measurements obtained by three receivers located at different space points.

RF signal propagation may be affected by various factors, including the presence of reflectors in the environment surrounding the transmitter and the receiver, which may create multiple paths that the RF signal may traverse. As a result, the receiver would see the superposition of multiple copies of the transmitted RF signal, each traversing a different path. Multipath propagation of RF signals may cause phase shift and signal interference, which in turn may cause signal fading, thus adversely affecting the accuracy of estimation of the AoA and other RF signal parameters.

Various common implementations attempt to compensate for the multipath signal propagation by increasing the physical size of the receiving antenna and/or the observation time. However, the antenna design requirements may limit the physical size of the antenna and/or the observation time based on the intended application, e.g., for mobile or wearable devices.

Figure 1:
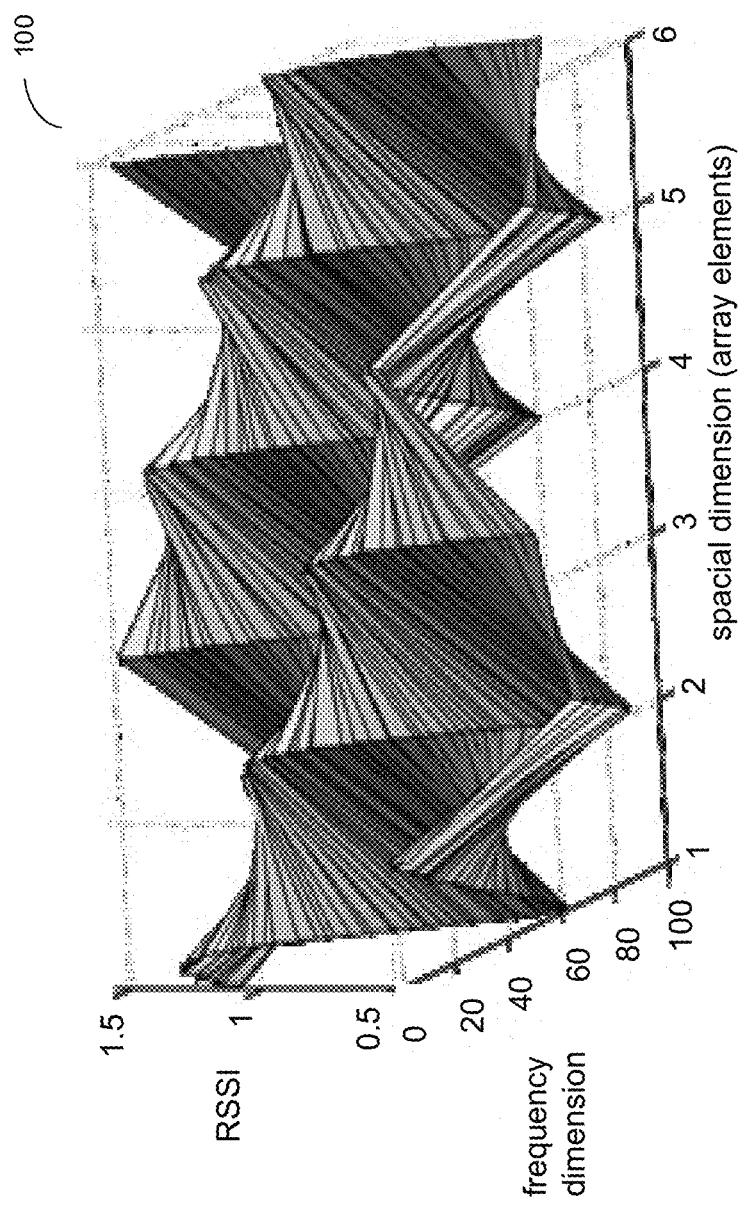
FIG. 1 depicts a plot illustrating an example distribution of the Received Signal Strength Indicator (RSSI) over the spatial characteristics of the receiving antenna array and the frequency spectral diversity.

The systems and methods described herein address the above-noted and various other deficiencies of common implementations by relying upon the frequency spectral diversity, which is present in various wireless communication protocols and implementations (e.g., Bluetooth Low Energy (BLE) channels or Wi-Fi subcarriers) and involves simultaneous and/or sequential transmission of RF signals at multiple RF channels. Since, as schematically illustrated by FIG. 1 and explained in more detail herein below, the RF signal propagation at each channel will respond differently to the presence of reflectors in the signal path, utilizing multiple RF channels may compensate for limited number of antenna array elements. Thus, the antenna response in the spatial domain may be inferred from analyzing the received signal parameter values in the frequency spectral domain.

While the inference may in theory be done analytically, i.e., by applying curve fitting and surface extrapolation methods, the complexity of such a function would depend exponentially upon the dimensionality of the task, and in particular, upon the number of reflectors in the signal path. Conversely, the systems and methods described herein utilize machine learning techniques in order to build and train the models for inferring the AoA and/or other parameters of the received RF signals (e.g., the LoS AoA, the reflection AoA, the attenuation of reflection, the relative delay of reflection, the relative phase, and/or other parameters) from the observed RF signal power levels (e.g., expressed by the RF signal magnitude and phase values) at multiple RF channels. Notably, the machine learning-based systems and methods of the present disclosure are highly scalable since the same set of models may be utilized for a wide range of input dimensions.

Various aspects of the methods and systems are described herein by way of examples, rather than by way of limitation. The methods described herein may be implemented by hardware (e.g., general purpose and/or specialized processing devices, and/or other devices and associated circuitry), software (e.g., instructions executable by a processing device), or a combination thereof.

As noted herein above, in order to improve the accuracy of estimating AoA and various other parameters of RF signals received by an antenna array in the presence of RF signal multi-paths, the physical dimensions of the antenna array and/or the observation time may be increased. However, applicability of such "brute force" approaches may be significantly restricted by various design requirements which may limit the physical size of the antenna array (e.g., for mobile or wearable devices) and/or the maximum observation time. Conversely, the systems and methods of the present disclosure rely upon frequency spectral diversity, which is inherently present in various aspects of wireless communications (e.g., Bluetooth Low Energy (BLE) channels or Wi-Fi subcarriers) and involves simultaneous and/or sequential transmission of RF signals at multiple RF channels. Since, as schematically illustrated by FIG. 1, the RF signal propagation at each channel will respond differently to the presence of reflectors in the signal path, utilizing multiple RF channels may compensate for limited number of antenna array elements.

FIG. 1 depicts the plot 100 illustrating the distribution of the Received Signal Strength Indicator (RSSI) over the spatial characteristics of the receiving antenna array (i.e., number of the antenna array elements) and the frequency spectral diversity (i.e., the number of RF channels utilized for signal transmission). While the illustrative example of FIG. 1 utilizes the RSSI, various other implementations may employ other RF signal parameters (such as the phase, the group delay, etc.).

As may be seen in FIG. 1, the RSSI response plot 100 contains multiple recurring patterns, such that the plotted peaks and valleys have similar sizes and appear periodically. Thus, the RSSI values in the spatial domain may be inferred from analyzing the RSSI values in the frequency spectral domain. In the illustrative example of FIG. 1, the spatial dimension may be cut off at a certain value (e.g., at four antenna array elements), and the RSSI values for the larger numbers of antenna array elements may be extrapolated from the RSSI values obtained from the RF signals received at the multiple RF channels.

As noted herein above, the systems and methods described herein utilize machine learning techniques in order to build and train the models for inferring the AoA and other parameters of the received signal (e.g., the LoS AoA, the reflection AoA, the attenuation of reflection, the relative delay of reflection, the relative phase, and/or other parameters) from the observed RF signal power levels at multiple RF channels. In some implementations, the observed RF signal power levels may be represented by a plurality of pairs of RF signal magnitude and phase for each of the antenna array elements.

Figure 2:
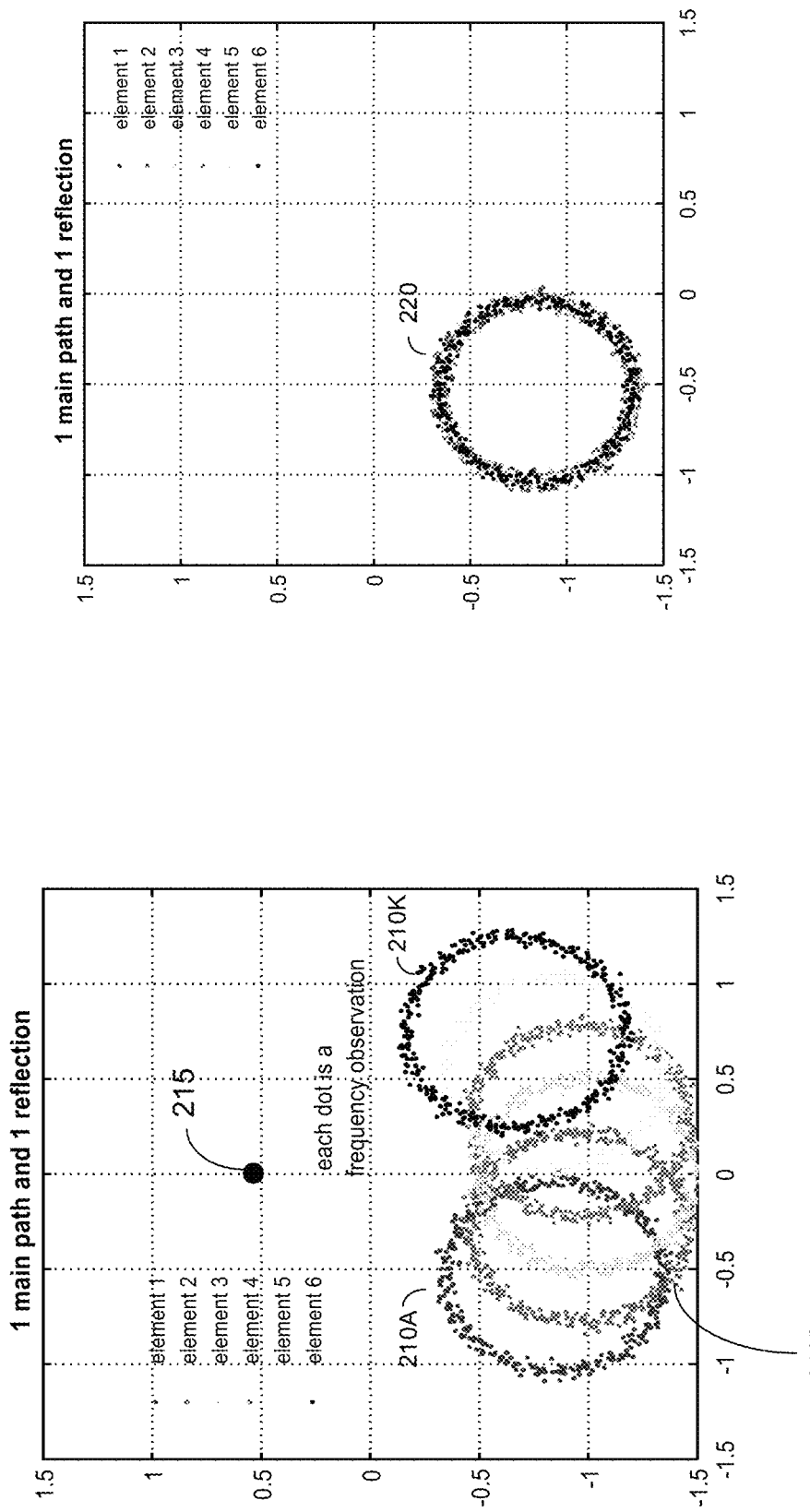
FIG. 2 depicts example visualization of the transformed input data plotted in a reduced-dimension space.

A machine learning-based model may perform feature extraction in order to reduce the dimensionality of the input data and thus significantly diminish the computational complexity of the task to be solved. FIG. 2 depicts an example visualization of the transformed input data plotted in a reduced-dimension space of in-phase and quadrature (I and Q) values. In FIG. 2, each circular plot 210A-210K visualizes the AoA of the RF signals received by a respective antenna array element, while each dot of the plots 210A-210K corresponds to an observation on a single frequency channel. While the examples described herein operate with AoA values, the systems and methods of the present disclosure are similarly applicable to other parameters of the received RF signals (e.g., the LoS AoA, the reflection AoA, the attenuation of reflection, the relative delay of reflection, the relative phase, and/or other parameters).

The machine learning-based model may utilize the extracted features (i.e., representation of the input data in the reduced-dimension space) for performing a regression task in order to estimate the values of the RF signal parameters. As schematically illustrated by FIG. 2, the regression process may be visualized by rotating the initial circle plots 210A-210K relative to a center of rotation 215, which is located outside of any of the plots 210A-210K, until they merge into a single combined plot 220, which would have a known set of parameters. Therefore, one or more parameters of the transformations applied to each of the initial circle plots 210A-210K (such as the angle of rotation) would reflect the difference between the known set of parameters of the combined plot 220 and the parameters of the initial circle plots 210A-210K. Therefore, AoA and/or other parameters of the RF signals that are depicted by the initial circle plots 210A-210K may be computed by modifying the known set of RF signal parameters represented by the combined plot 220 based on the parameters of the transformations applied to each of the initial circle plots 210A-210K.

While in the illustrative example of FIG. 2 the transformations applied to each of the initial circle plots 210A-210K are rotational transformations, other types of transformations (e.g., scaling along one or more axes) may be applied by the machine learning model in performing the regression task. Accordingly, the parameters of these transformations may include, e.g., the angle of rotation, the aspect ratio, the scaling factor, etc.

In some implementations, the model employed for performing the feature extraction and regression may be implemented by a neural network, such as a convolutional neural network (CNN) or a recurrent neural network (RNN). A neural network is a computational model that implements a multitude of connected nodes called "artificial neurons," such that each artificial neuron processes one or more input signals (including a bias signal) and transmits the output signal to one or more neighboring artificial neurons. The output of an artificial neuron may be computed by applying its activation function to a linear combination of its inputs. A neural network may be trained by processing examples ("training data sets") to perform feature extraction, regression and/or classification tasks, generally without being programmed with any task-specific rules, as described in more detail herein below.

Figure 3:
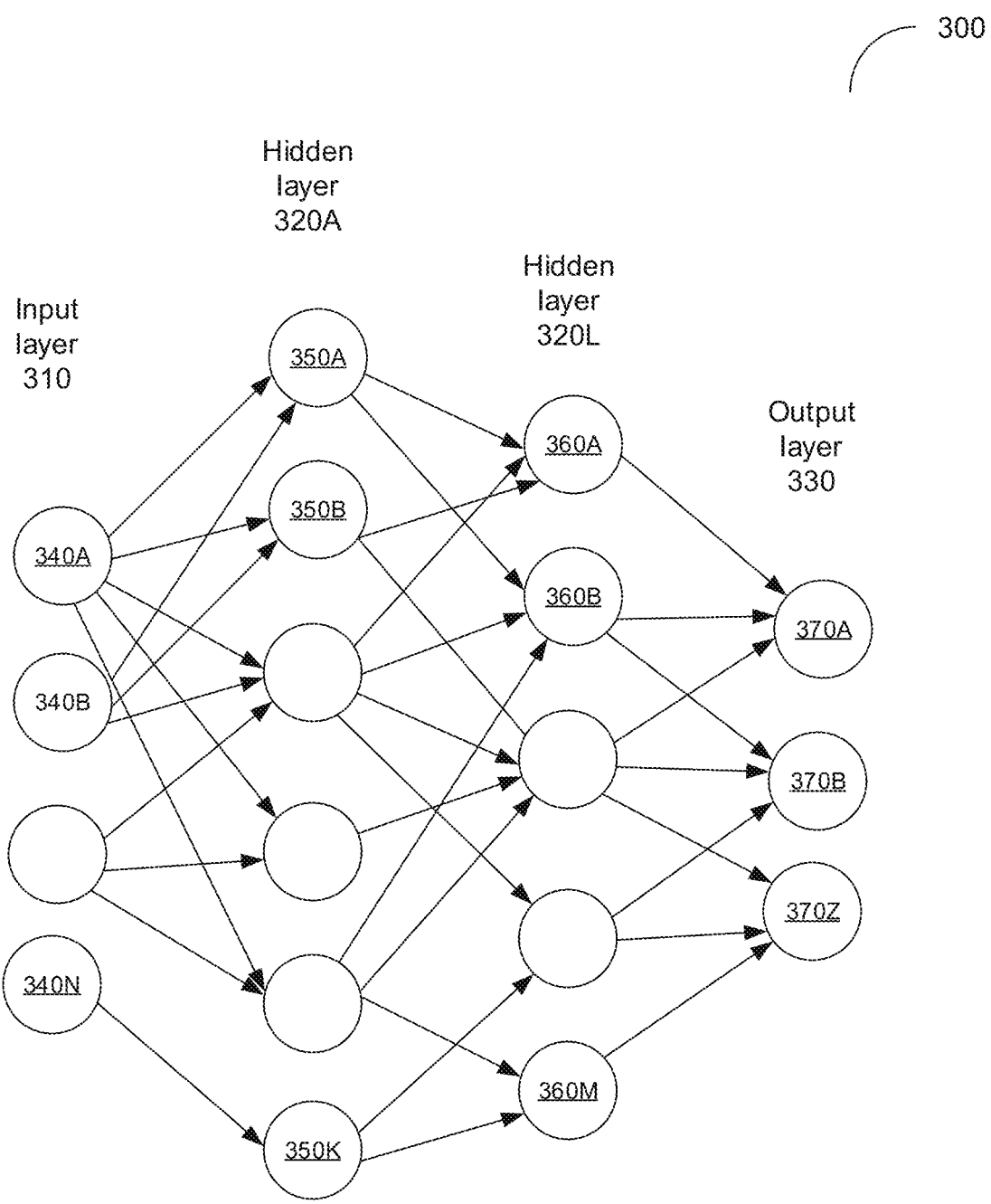
FIG. 3 schematically illustrates a structure of an example neural network.

As schematically illustrated by FIG. 3, the neural network employed by the systems and methods of the present disclosure may be represented by a multilayer perceptron (MLP) 300, the artificial neurons of which are grouped into several layers, including the input layer 310, one or more hidden layers 320A-320L, and the output layer 330. The input layer 310 includes one or more neurons 340A-340N, which are connected to one or more neurons 350A-350K of the first hidden layer 320A. The first hidden layer neurons 350A-350K are, in turn, connected to one or more neurons 360A-360M of the second hidden layer 320L. The second hidden layer neurons 360A-360M are, in turn, connected to one or more neurons 370A-370Z of the output layer 330. At least some of the nodes of the artificial neural network 300 may utilize nonlinear activation functions, while the remaining nodes (e.g., the nodes of the output layer) may utilize linear activation functions. While FIG. 3 schematically illustrates a single hidden layer 350, in various implementations of the systems and methods of the present disclosure the number of hidden layers may vary. In some embodiments, the number of hidden layers is a hyperparameter of the model, i.e., a parameter, the value of which is specified before the training process. Other hyperparameters of the model may include the numbers of nodes in each layer, the activation function types, etc.

Each edge in FIG. 3 denotes a connection for transmitting a signal from one artificial neuron to another, in a manner similar to operation of the synapses in the human brain. Edge weights, which increase or attenuate the signals being transmitted through respective connections, are defined at the network training stage based on a training dataset that includes a plurality of labeled inputs (i.e., inputs with known classification).

The neural network training procedure may start with initializing all edge weights and neuron bias values to random or predetermined values. The forward propagation involves sequentially processing, by the neural network, the labeled data items of the training dataset (i.e., a plurality of vectors of RF signal power levels, such that each vector, which includes RF signal magnitude and phase values measured by the multiple antenna elements at a given frequency channel, is labeled with the corresponding AoA value and/or other RF signal parameter values). The observed output of the neural network is compared with the desired output specified by the label associated with the vector being processed, and the error is propagated back to the previous layers of the neural network, in which the weights and bias values are adjusted to minimize the predetermined loss function (e.g., the difference between the observed output and the desired output specified by the label). This process may be repeated until the output error would fall below a predetermined threshold.

As noted herein above with reference to FIG. 2, a machine learning-based model implementing the systems and methods of the present disclosure may process a multitude of parameters of RF signals received at multiple frequency channels, by first performing the feature extraction in order to reduce the dimensionality of the raw data, and then performing regression in order to estimate the values of the RF signal parameters. In some implementations, both feature extraction and regression may be performed by the same neural network, in which one or more layers perform the feature extraction, while the remaining layers perform the regression task. In other implementations, two separately trained neural networks may be employed for performing the feature extraction and regression tasks.

Figure 4:
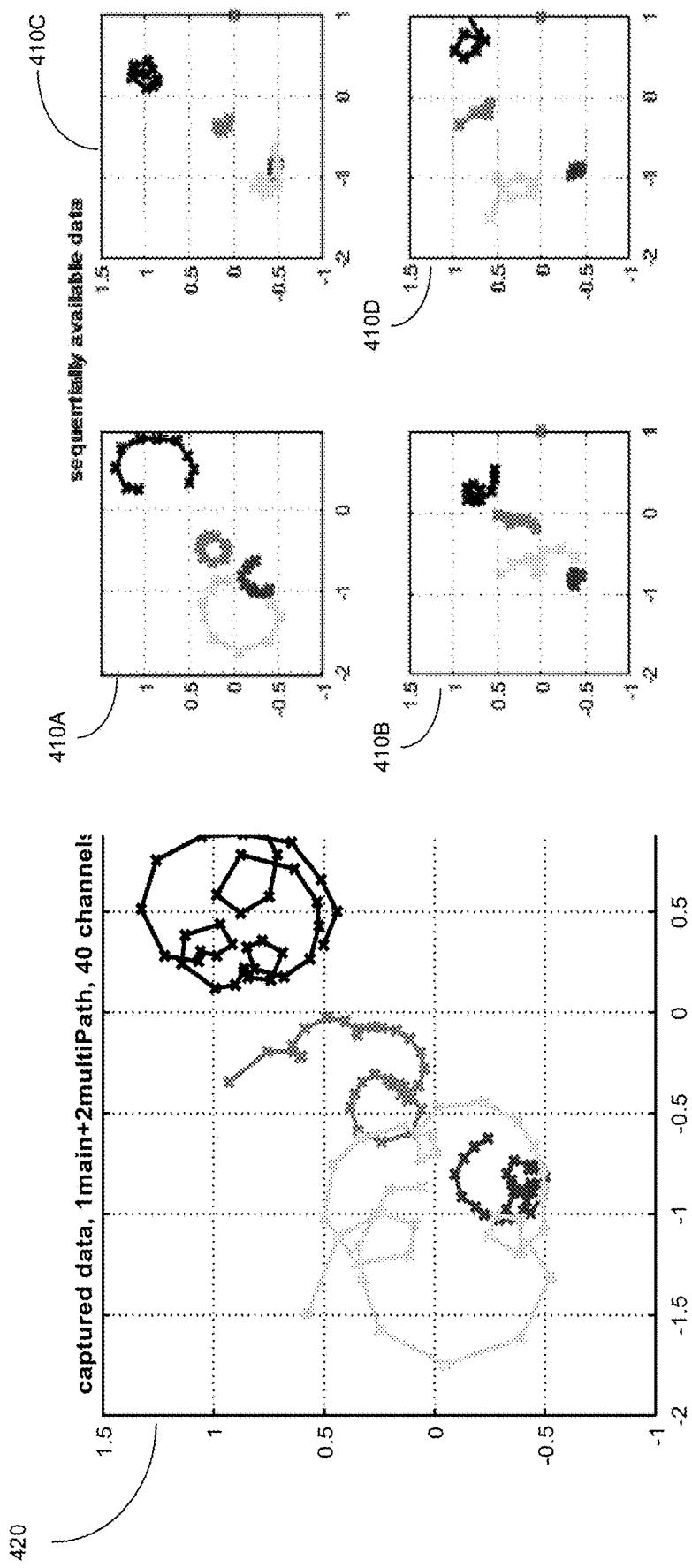
FIG. 4 depicts several plots illustrating sequential RF signal power level measurements on multiple RF channels.

As noted herein above, the systems and methods of the present disclosure leverage the frequency spectral diversity in order to infer the distribution of the signal power level in the spatial domain. However, in practice, the number of the available RF channels may be limited by various design and/or implementation-specific constraints. As schematically illustrated by a series of plots 410A-410D of FIG. 4, the raw data measurements on the limited number of available frequency channels may only reveal certain portions of each curve, rather than closed loop curves similar to the circular plots shown in FIG. 2.

Furthermore, the RF signals may be transmitted sequentially rather than simultaneously at multiple frequency channels. In the illustrative example of FIG. 4, each of the plots 410A-410D reflects the RF signal measurements at a corresponding set of RF channels. While various common techniques may not be well suited for processing the sequential data, the systems and methods of the present disclosure advantageously employ recurrent neural networks (RNN) for sequentially processing batches of raw data in real time.

An RNN is capable of maintaining its state, which reflects the information about the inputs which have been previously processed by the network. The RNN would take the state information into account for processing each subsequent input. In other words, the network output is defined not only by the current input, but also by the inputs that have been previously processed by the network.

Some RNNs may be susceptible to the gradient attenuation effect, which renders a network practically incapable of processing long input sequences. The gradient attenuation effect may be avoided by utilizing long short-term memory (LSTM) layers, which are utilizing a gating mechanism allowing the network to choose, for performing the next layer of processing, between the own state and the input. Since the LSTM neural networks exhibit very low gradient attenuation, such networks are capable of processing longer input sequences.

Thus, an RNN-based model may sequentially process multiple batches of parameters of RF signals received at multiple frequency channels and, after processing each batch, increase the accuracy of estimation of the AoA and/or other parameters of the received RF signals. In the illustrative example of FIG. 4, the plot 420 reflects the sequential processing of RF signals received in four batches depicted by plots 410A-410D.

The neural networks utilized by the systems and methods of the present disclosure may be deployed on the hardware having limited computational capacity and/or available memory (such as mobile or wearable devices), since the raw data reflecting thousands of measurement points would be processed sequentially, and each batch of raw data may be discarded after having been processed by the neural network, since the internal state of the neural network stores the necessary information extracted from the input data processed by the network.

In some implementations, the raw input data may be processed by a sequence of two or more models, in which every model infers the AoA and/or other parameters of the received RF signals (e.g., the LoS AoA, the reflection AoA, the attenuation of reflection, the relative delay of reflection, the relative phase, and/or other parameters) from the observed RF signal power levels (e.g., expressed by the RF signal magnitude and phase values) at multiple RF channels, and each subsequent model has been trained on a training data set produced in a signal propagation environment that includes a larger number of reflectors (and thus a larger number of signal paths) than the number of reflectors in the signal propagation environment that has produced the training data set utilized for training the previous model in the sequence. In the illustrative example of FIG. 5, the model 510A has been trained on the first training data set produced in the first signal propagation environment that includes a single signal path (i.e., no multipaths); the model 510A infers the AoA from the observed RF signal power levels. The model 510B has been trained on the second training data set produced in the second signal propagation environment that includes at least two signal paths; the model 510B infers the AoA and the characteristics of the first reflection (the reflection AoA, the attenuation of reflection, the relative delay of reflection, the relative phase) from the observed RF signal power levels. The model 510C has been trained on the third training data set produced in the third signal propagation environment that includes at least three signal paths; the model 510C infers the AoA and the characteristics of the first and second reflections (the reflection AoA, the attenuation of reflection, the relative delay of reflection, the relative phase) from the observed RF signal power levels.

Figure 5:
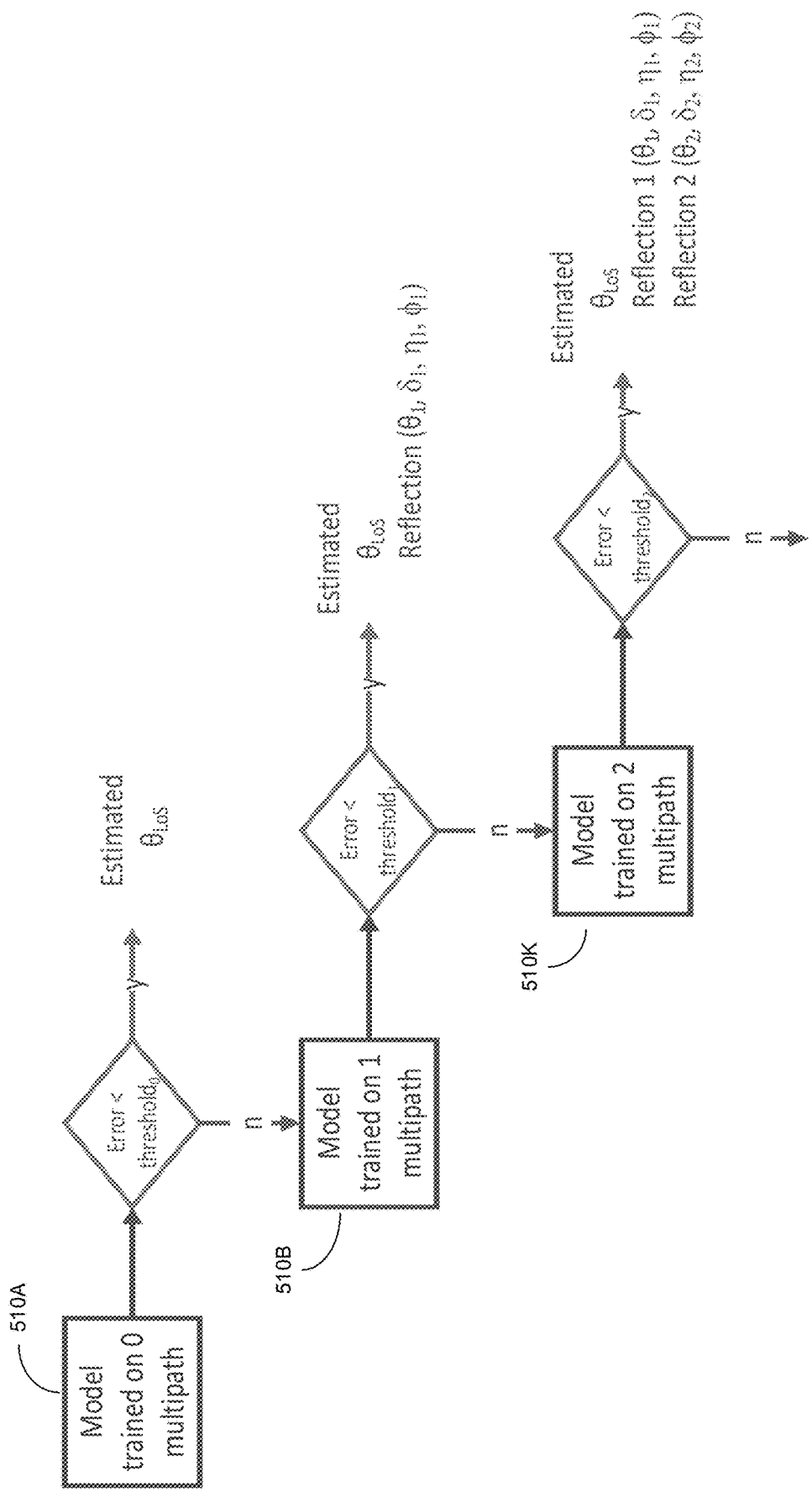
FIG. 5 schematically illustrates a sequence of models, in which each subsequent model has been trained on a training data set produced in a signal propagation environment that includes a larger number of signal paths than the number of signal paths in the signal propagation environment that has produced the training data set utilized for training the previous model in the sequence.

While FIG. 5 shows the set of three models, in various implementations of the systems and methods of the present disclosure the number sequentially applied models may vary.

Estimating AoA error may involve reconstructing the inputs (i.e., RF signal magnitude and phase values) based on the estimated AoA outputs and comparing the reconstructed inputs to the observed inputs, thus allowing to estimate the AoA error even if the true AoA value is unknown.

The output of every model 510 is analyzed by comparing the estimated error value to a predetermined threshold value (which maybe specified by a hyperparameter of the corresponding model 510). Should the estimated error value exceed the predetermined threshold value, the next model 510 may be activated. Such iterations may continue until the estimated error value would become less than or equal to the predetermined threshold value, at which point the method may terminate, and the output produced by the current level model 510 may be utilized as the final output.

Thus, each of the models 510A-510K of FIG. 5 may be trained separately using a training data set produced in a signal propagation environment that includes a requisite number of signal paths. In some implementations, a model may be further trained on another training data set produced in a signal propagation environment that includes a lesser than the requisite number of signal paths, thus ensuring the backward compatibility of the models 510A-510K, i.e., ensuring that the higher level model would produce satisfactory results for the raw data measured in a signal propagation environment having a lesser number of signal paths than the number of signal paths in the signal propagation environment that has been utilized for training the model.

Figure 6:
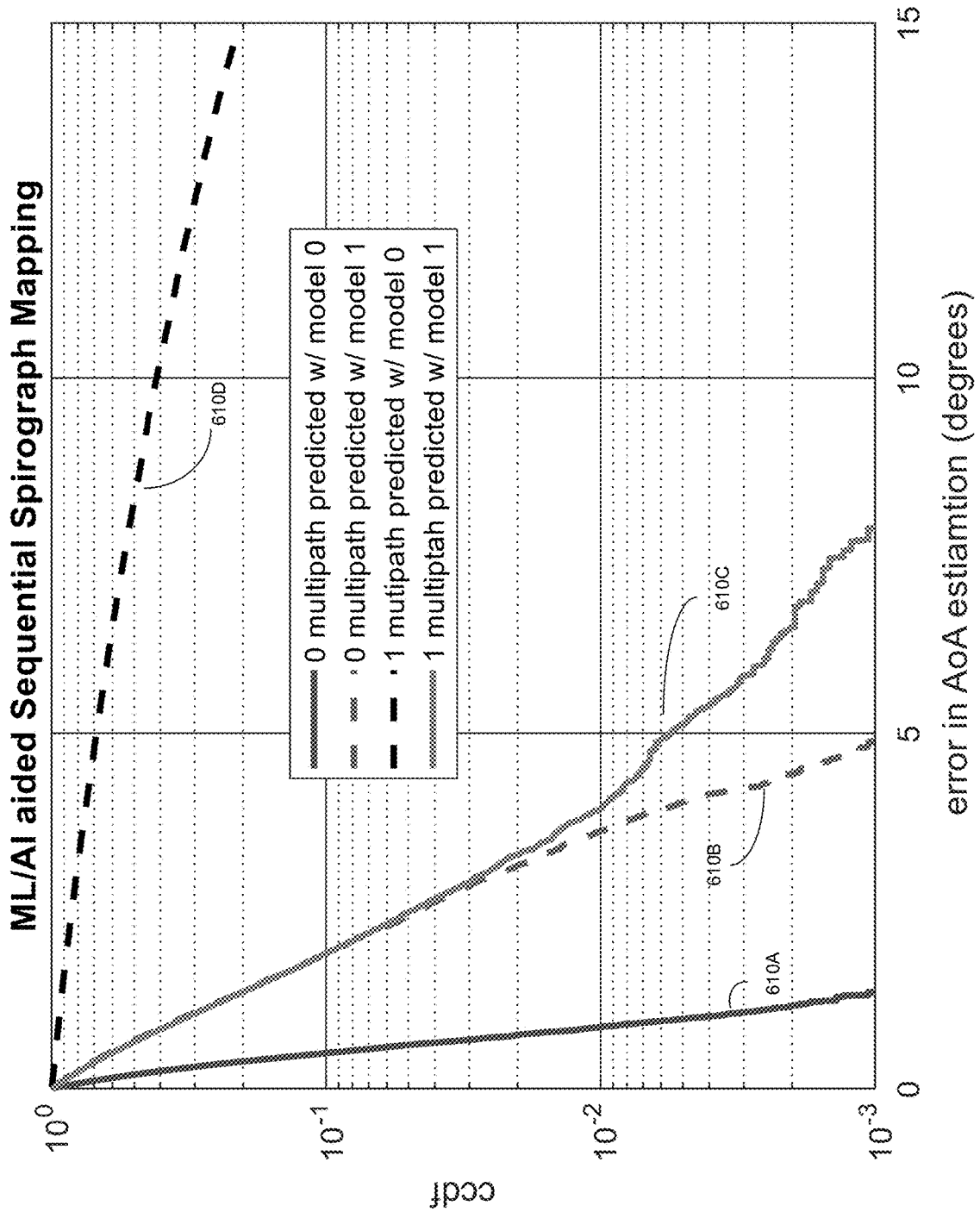
FIG. 6 schematically illustrates the error in angle of arrival (AoA) estimation by the sequence of models of FIG. 5.

FIG. 6 schematically illustrates the error in AOA estimation, in degrees, by the set of models 510A-510K of FIG. 5. In FIG. 6, the plot 610A depicts the AoA estimation error (in degrees) for zero multipath environment by the model trained on a training data set obtained from a zero multipath environment, the plot 610B depicts the AoA estimation error (in degrees) for zero multipath environment by the model trained on a training data set obtained from a one multipath environment, the plot 610C depicts the AoA estimation error (in degrees) for one multipath environment by the model trained on a training data set obtained from a one multipath environment, and the plot 610D depicts the AoA estimation error (in degrees) for one multipath environment by the model trained on a training data set obtained from a zero multipath environment. As seen from FIG. 6, the pairs of plots 610A-610B show similar AoA estimation errors, thus demonstrating the backward compatibility of higher-order models in lower-order multipath environments.

Notably, the models 510A-510K may be deployed on the hardware having limited computational capacity and/or available memory (such as mobile or wearable devices). Since at any given moment in time only one model needs to be operational, the hardware footprint should only be sufficient for deploying the largest model of the series, since each model may be discarded after use, and the next model may be loaded on the same hardware.

Figure 7:
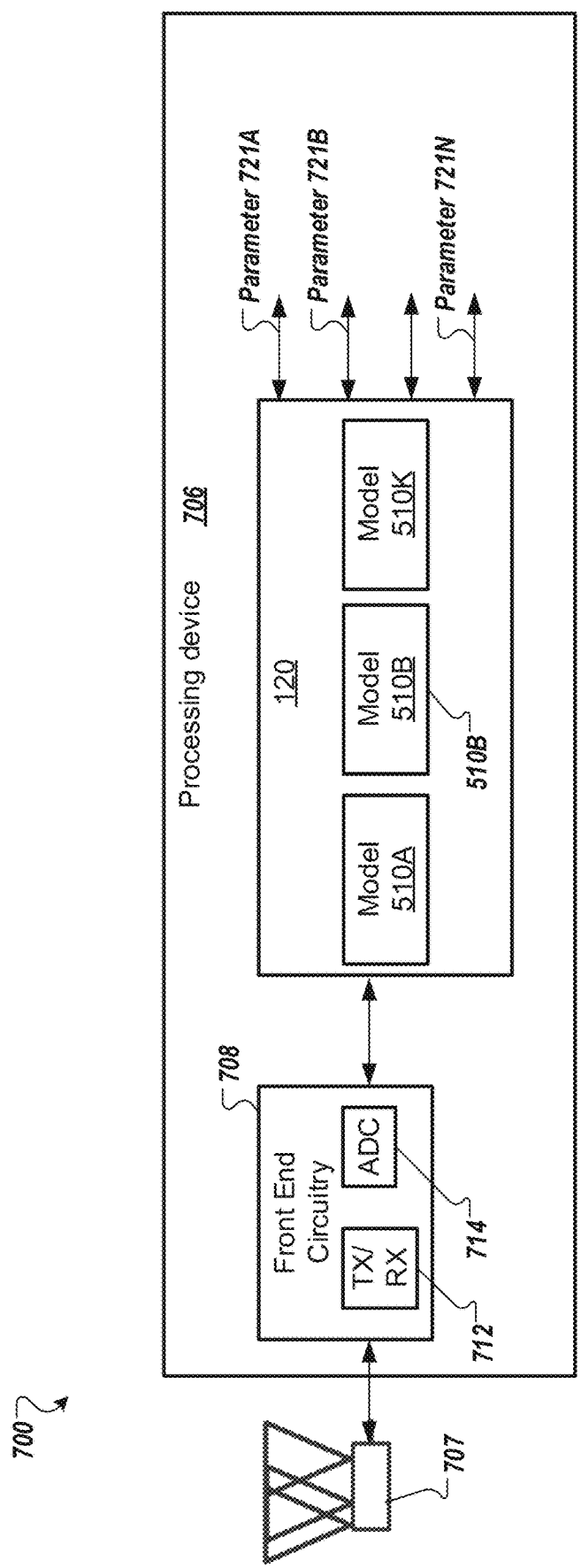
FIG. 7 is a block diagram of a system that implements estimating the AoA and/or other parameters of RF signals that are received by an antenna array.

FIG. 7 is a block diagram of a system that implements estimating the AoA and/or other parameters of RF signals that are received by an antenna array. The system 700 may include the processing device 706, which in turn includes a front-end circuitry 708 coupled to the antenna array 707. The front-end circuitry 708 may include a transceiver 712 and an analog-to-digital converter (ADC) 714. The transceiver 712 coupled to the antenna array 707 may transmit or receive RF signals via the antenna array 707. The processing device may implement the AoA estimation tool 120, as described herein. The processing device may include one or more application processors, one or more host processors, one or more microcontrollers, and/or other processing components. In some embodiments, the system 700 may be implemented as a System-on-Chip (SoC) including the transceiver and a processor to process digital values representing the RF signals received or transmitted by the transceiver. The transceiver and the processor may reside on a common carrier substrate or may be implemented in separate integrated circuits.

In some implementations, the processing device may receive a plurality of pairs of RF signal magnitude and phase measured by each of the antenna array elements at each of the multiple RF channels. The processing device may then apply a machine learning model in order to compute the AoA and/or other parameters 721A-721N of the received RF signal (e.g., the LoS AoA, the reflection AoA, the attenuation of reflection, the relative delay of reflection, the relative phase, and/or other parameters). The machine learning model may perform feature extraction in order to reduce the dimensionality of the input data and then may utilize the extracted features (i.e., representation of the input data in the reduced-dimension space) for performing a regression task in order to estimate the RF signal parameter value, as described in more detail herein above.

Figure 8:
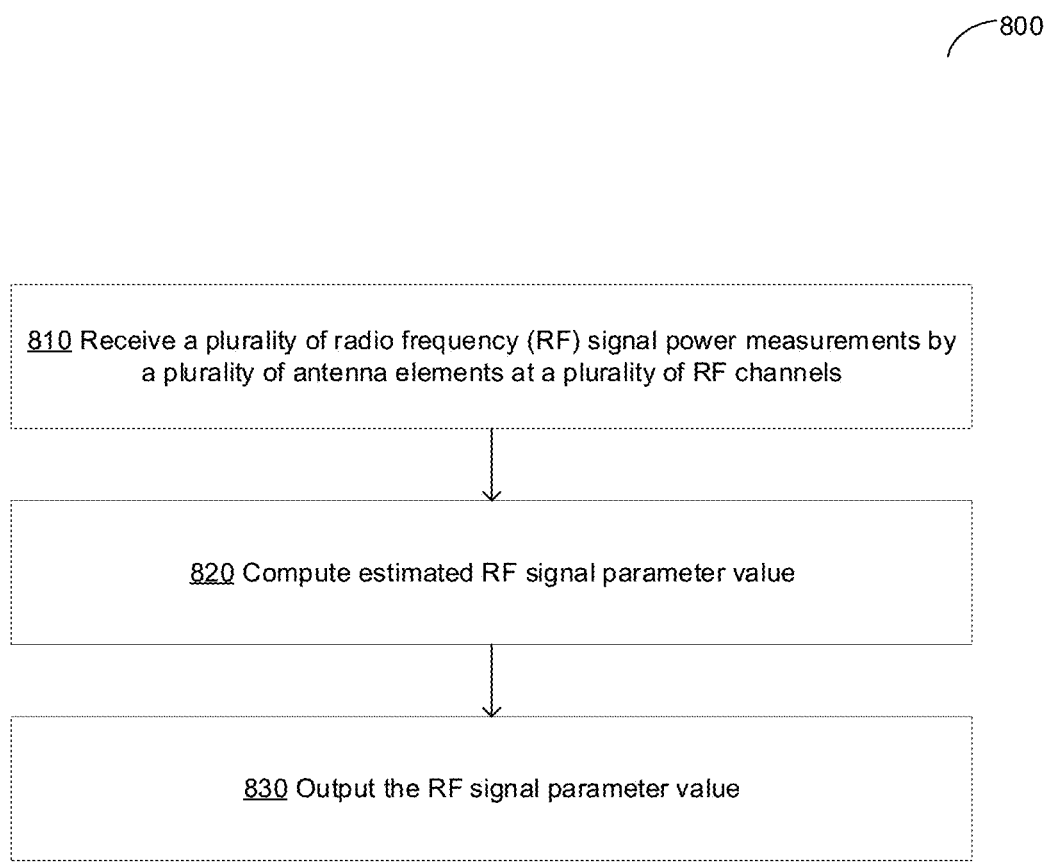
FIG. 8 is a flow diagram of an example method of estimating the AoA and/or other parameters of RF signals that are received by an antenna array at multiple RF channels.

FIG. 8 is a flow diagram of an example method of estimating the AoA and/or other parameters of RF signals that are received by an antenna array at multiple RF channels. The method 800 and/or each of its individual functions, routines, subroutines, or operations may be performed by processing logic comprising hardware (circuitry, dedicated logic, etc.), software (such as is run on a general purpose computing system or a dedicated machine), firmware (embedded software), or any combination thereof. Two or more functions, routines, subroutines, or operations of method 800 may be performed in parallel or in an order that may differ from the order described below. In certain implementations, method 800 may be performed by a single processing thread. Alternatively, method 800 may be performed by two or more processing threads, each thread executing one or more individual functions, routines, subroutines, or operations of the method. In an illustrative example, the processing threads implementing method 800 may be synchronized (e.g., using semaphores, critical sections, and/or other thread synchronization mechanisms). Alternatively, the processing threads implementing method 800 may be executed asynchronously with respect to each other. In one embodiment, the operations of methods 800 may be performed by the processing device 706 of the example system 700 of FIG. 7.

At block 810, the processing device implementing the method may receive a plurality of radio frequency (RF) signal power measurements by a plurality of antenna elements at a plurality of RF channels. In some implementations, the observed RF signal power levels may be represented by a plurality of pairs of RF signal magnitude and phase for each of the antenna array elements, as described in more detail herein above.

At block 820, the processing device may compute an estimated RF signal parameter value by applying a machine learning model to the plurality of RF signal power measurements. The RF signal parameter may be represented by the AoA and/or other parameters of the received signal (e.g., the LoS AoA, the reflection AoA, the attenuation of reflection, the relative delay of reflection, the relative phase, and/or other parameters). The machine learning model may perform feature extraction in order to reduce the dimensionality of the input data. The machine learning may then utilize the extracted features (i.e., representation of the input data in the reduced-dimension space) for performing a regression task in order to estimate the RF signal parameter value, as described in more detail herein above.

At block 830, the processing device may output the RF signal parameter value (e.g., by displaying the RF signal parameter value and/or transmitting the RF signal parameter value to one or more recipients over one or more communication networks), and the method may terminate.

Figure 9:
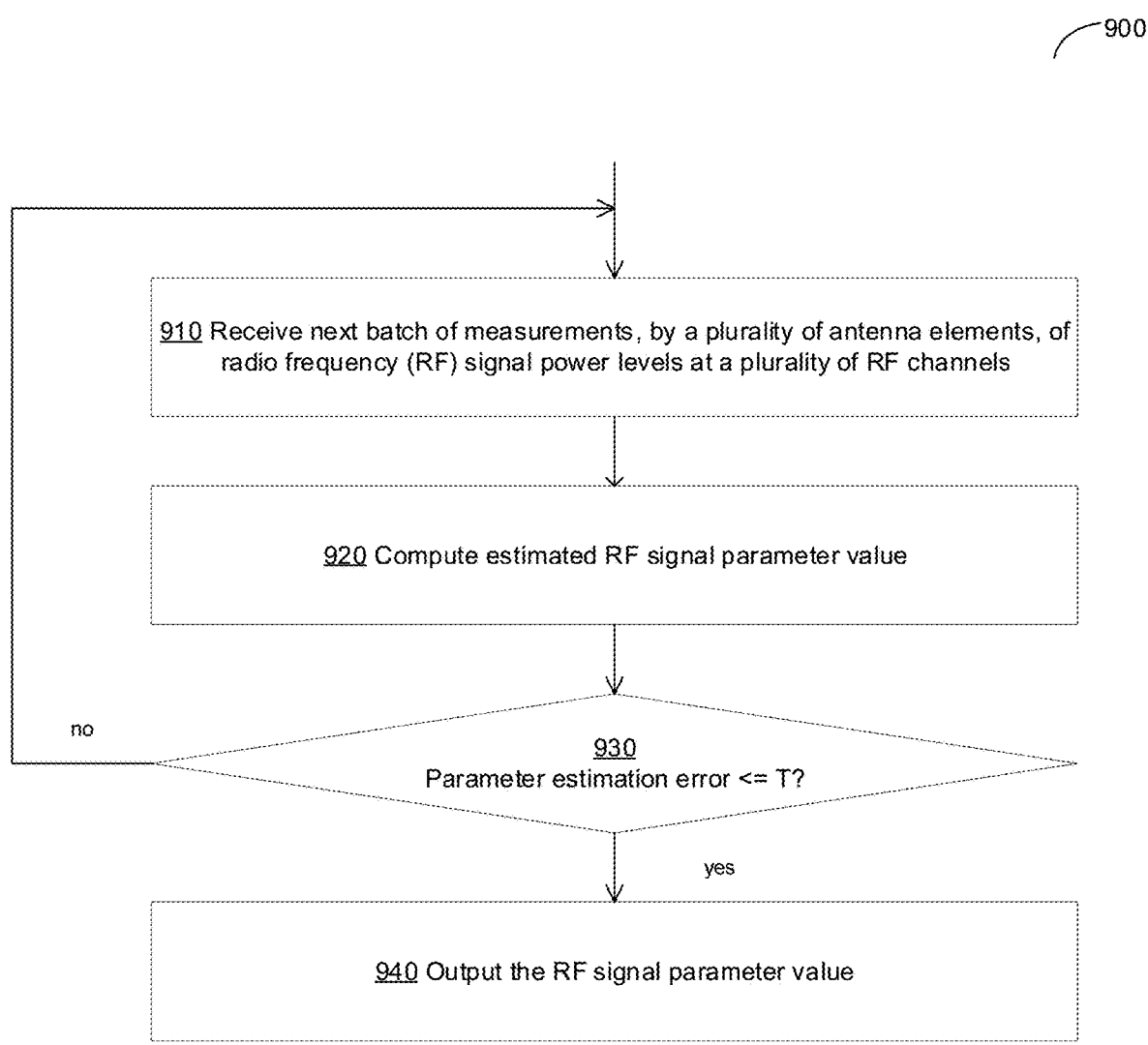
FIG. 9 is a flow diagram of an example method of iteratively estimating the AoA and/or other parameters of RF signals based on the RF signal level measurements that are sequentially received by an antenna array at multiple RF channels.

FIG. 9 is a flow diagram of an example method of iteratively estimating the AoA and/or other parameters of RF signals based on the RF signal level measurements that are sequentially received by an antenna array at multiple RF channels. The method 900 and/or each of its individual functions, routines, subroutines, or operations may be performed by processing logic comprising hardware (circuitry, dedicated logic, etc.), software (such as is run on a general purpose computing system or a dedicated machine), firmware (embedded software), or any combination thereof. Two or more functions, routines, subroutines, or operations of method 900 may be performed in parallel or in an order that may differ from the order described below. In certain implementations, method 900 may be performed by a single processing thread. Alternatively, method 900 may be performed by two or more processing threads, each thread executing one or more individual functions, routines, subroutines, or operations of the method. In an illustrative example, the processing threads implementing method 900 may be synchronized (e.g., using semaphores, critical sections, and/or other thread synchronization mechanisms). Alternatively, the processing threads implementing method 900 may be executed asynchronously with respect to each other. In one embodiment, the operations of methods 900 may be performed by the processing device 706 of the example system 700 of FIG. 7.

At block 910, the processing device implementing the method may receive a batch of measurements, by a plurality of antenna elements, of radio frequency (RF) signal power levels at a plurality of RF channels. In some implementations, the observed RF signal power levels may be represented by a plurality of pairs of RF signal magnitude and phase for each of the antenna array elements, as described in more detail herein above.

At block 920, the processing device may compute, by applying a machine learning model to the received batch of RF signal power measurements, an estimated RF signal parameter value. The RF signal parameter may be represented by the AoA and/or other parameters of the received signal (e.g., the LoS AoA, the reflection AoA, the attenuation of reflection, the relative delay of reflection, the relative phase, and/or other parameters). The machine learning model may perform feature extraction in order to reduce the dimensionality of the input data. The machine learning may then utilize the extracted features (i.e., representation of the input data in the reduced-dimension space) for performing a regression task in order to estimate the RF signal parameter value, as described in more detail herein above.

Responsive to determining, at block 930, that the parameter estimation error exceeds a predetermined threshold error value, the method may loop back to block 910, at which the next batch of measurements, for a different set of RF channels, may be received. Otherwise, if the parameter estimation error is less than or equal to the predetermined threshold error value, the method may continue to block 940.

At block 940, the processing device may output the RF signal parameter value (e.g., by displaying the RF signal parameter value and/or transmitting the RF signal parameter value to one or more recipients over one or more communication networks), and the method may terminate.

Figure 10:
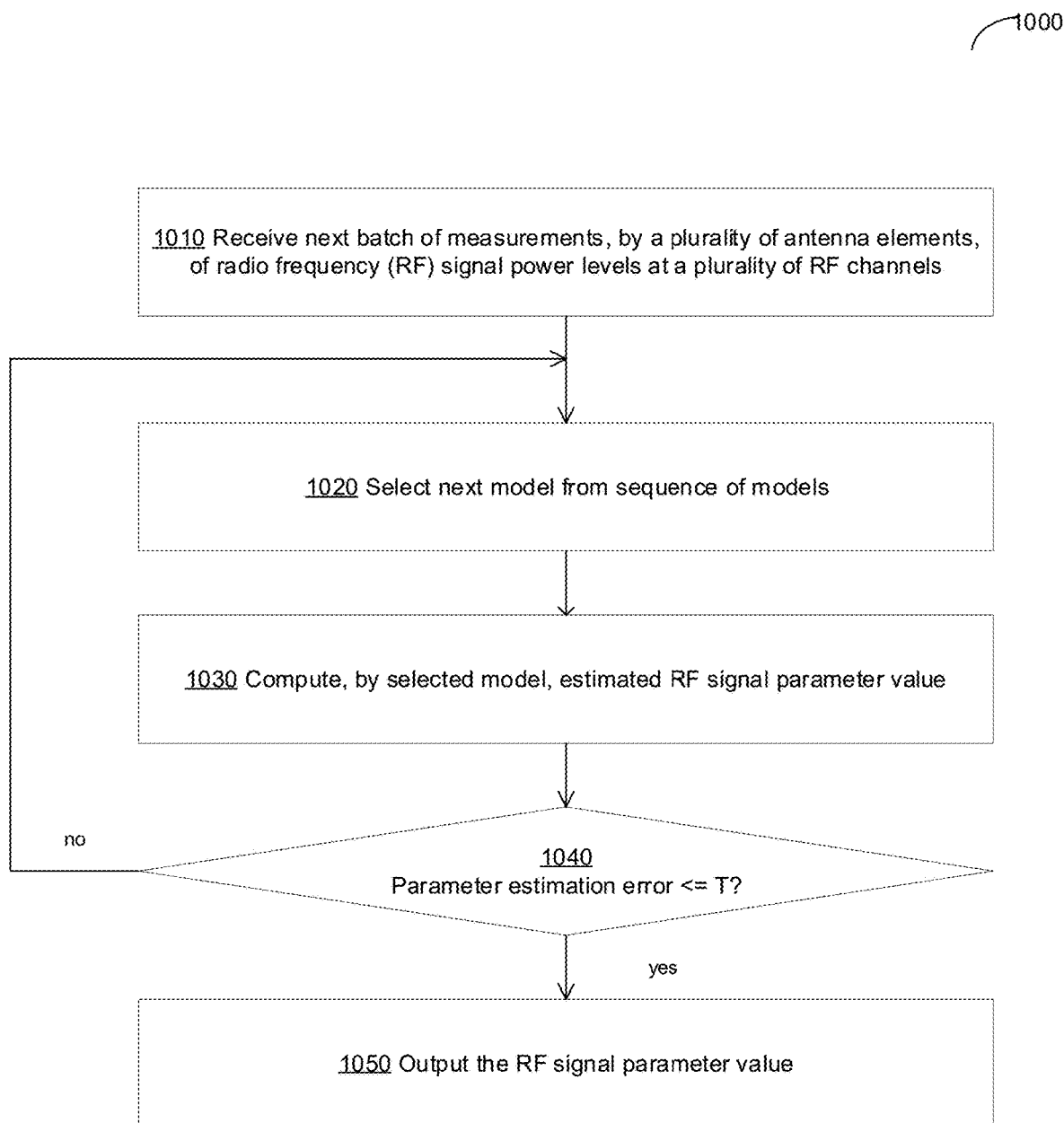
FIG. 10 is a flow diagram of an example method of iteratively estimating, by a set of machine learning models, the AoA and/or other parameters of RF signals that are received by an antenna array at multiple RF channels.

FIG. 10 is a flow diagram of an example method of iteratively estimating, by a set of machine learning models, the AoA and/or other parameters of RF signals that are received by an antenna array at multiple RF channels. The method 1000 and/or each of its individual functions, routines, subroutines, or operations may be performed by processing logic comprising hardware (circuitry, dedicated logic, etc.), software (such as is run on a general purpose computing system or a dedicated machine), firmware (embedded software), or any combination thereof. Two or more functions, routines, subroutines, or operations of method 1000 may be performed in parallel or in an order that may differ from the order described below. In certain implementations, method 1000 may be performed by a single processing thread. Alternatively, method 1000 may be performed by two or more processing threads, each thread executing one or more individual functions, routines, subroutines, or operations of the method. In an illustrative example, the processing threads implementing method 1000 may be synchronized (e.g., using semaphores, critical sections, and/or other thread synchronization mechanisms). Alternatively, the processing threads implementing method 1000 may be executed asynchronously with respect to each other. In one embodiment, the operations of methods 1000 may be performed by the processing device 706 of the example system 700 of FIG. 7.

At block 1010, the processing device implementing the method may receive a plurality of RF signal power measurements by a plurality of antenna elements at a plurality of RF channels. In some implementations, the observed RF signal power levels may be represented by a plurality of pairs of RF signal magnitude and phase for each of the antenna array elements, as described in more detail herein above.

At block 1020, the processing device may select the next machine learning model from a sequence of two or more models, in which each subsequent model has been trained on a training data set produced in a signal propagation environment that includes a larger number of reflectors (and thus a larger number of signal paths) than the number of reflectors in the signal propagation environment that has produced the training data set utilized for training the previous model in the sequence. Each machine learning model may perform feature extraction in order to reduce the dimensionality of the input data. The machine learning may then utilize the extracted features (i.e., representation of the input data in the reduced-dimension space) for performing a regression task in order to estimate the RF signal parameter value, as described in more detail herein above.

At block 1030, the processing device may apply the selected a machine learning model to the plurality of RF signal power measurements in order to compute an estimated RF signal parameter value. The RF signal parameter may be represented by the AoA and/or other parameters of the received signal (e.g., the LoS AoA, the reflection AoA, the attenuation of reflection, the relative delay of reflection, the relative phase, and/or other parameters), as described in more detail herein above.

Responsive to determining, at block 1040, that the parameter estimation error exceeds a predetermined threshold error value, the method may loop back to block 1010, at which the next model is selected from the sequence of models. Otherwise, if the parameter estimation error is less than or equal to the predetermined threshold error value, the method may continue to block 1050.

At block 1050, the processing device may output the RF signal parameter value (e.g., by displaying the RF signal parameter value and/or transmitting the RF signal parameter value to one or more recipients over one or more communication networks), and the method may terminate.

The embodiments described herein may be implemented by an electronic system including a processing device that may perform the same or similar functions as described with respect the above figures, and vice versa. In another embodiment, the processing device may be a microprocessor or a microcontroller. The AoA estimation tool 120 may be implemented as firmware executing on the microcontroller or microprocessor. The microcontroller may report the estimates described herein to an application processor. The electronic system may include a host processor for a computer system that utilizes the microcontroller to provide the estimates described herein. The host processor may include one or more processing devices, a memory, and other hardware or software components that perform operations for the electronic system.

The processing device may include analog and or digital general purpose input/output ("GPIO") ports. GPIO ports may be programmable. GPIO ports may be coupled to a Programmable Interconnect and Logic ("PIL"), which acts as an interconnect between GPIO ports and a digital block array of the processing device. The processing device may include analog blocks that may be programmed and reprogrammed in some cases to implement various analog functions. The processing device may also include a digital block array. The digital block array may be configurable to implement a variety of digital logic circuits (e.g., DACs, digital filters, or digital control systems) using, in one embodiment, configurable user modules ("UMs"). The digital block array may be coupled to a system bus. Processing device may also include a memory device, such as random access memory ("RAM") and program flash. RAM may be static RAM ("SRAM"), and program flash may be a non-volatile storage, which may be used to store firmware (e.g., control algorithms executable by a processor to implement operations described herein). Processing device may also include a memory controller unit ("MCU") coupled to memory and the processor. The processor may be a processing element (e.g., processor core) configured to execute instructions or perform operations. The processor may include other processing elements as would be appreciated by one of ordinary skill in the art having the benefit of this disclosure. It should also be noted that the memory may be internal to the processing device or external to it. In the case of the memory being internal, the memory may be coupled to a processing element, such as the processing core. In the case of the memory being external to the processing device, the processing device is coupled to the other device in which the memory resides as would be appreciated by one of ordinary skill in the art having the benefit of this disclosure.

In one embodiment, the processing device further includes processing logic. Some or all of the operations of the processing logic may be implemented in firmware, hardware, or software or some combination thereof. The processing logic may receive signals from the antenna array, as described herein. The processing device may also include an analog block array (e.g., field-programmable analog array). The analog block array may also be coupled to the system bus. Analog block array may also be configurable to implement a variety of analog circuits (e.g., ADCs or analog filters) using, in one embodiment, configurable UMs. The analog block array may also be coupled to the GPIO ports. The processing device may include internal oscillator/clocks and communication block ("COM"). In another embodiment, the processing device includes a spread-spectrum clock. The oscillator/clocks block provides clock signals to one or more of the components of processing device. Communication block may be used to communicate with an external component, such as a host processor (also referred to as an application processor), via application interface ("I/F") line.

The processing device may reside on a common carrier substrate such as, for example, an integrated circuit ("IC") die substrate, a multi-chip module substrate, or the like. Alternatively, the components of processing device may be one or more separate integrated circuits and or discrete components. In one exemplary embodiment, processing device is the Programmable System on a Chip (PSoC®) processing device, developed by Cypress Semiconductor Corporation, San Jose, Calif. Alternatively, processing device may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to an application processor, but may include a system that measures the RF signals and sends the raw data to a host computer where it is analyzed by an application. In effect, the processing that is done by processing device may also be done in the application processor.

The AoA estimation tool 120 may be integrated into the IC of the processing device, or alternatively, in a separate IC. Alternatively, descriptions of the AoA estimation tool 120 may be generated and compiled for incorporation into other integrated circuits. For example, behavioral level code describing parameters for the AoA estimation tool 120, or portions thereof, may be generated using a hardware descriptive language, such as VHDL or Verilog, and stored to a machine-accessible medium (e.g., CD-ROM, hard disk, floppy disk, etc.). Furthermore, the behavioral level code may be compiled into register transfer level ("RTL") code, a netlist, or even a circuit layout and stored to a machine-accessible medium. The behavioral level code, the RTL code, the netlist, and the circuit layout may represent various levels of abstraction to describe the AoA estimation tool 120. It should be noted that the components of electronic system may include all, some, or none of the components described above.

In one embodiment, the electronic system may be used in a tablet computer. Alternatively, the electronic device may be used in other applications, such as a notebook computer, a mobile handset, a personal data assistant ("PDA"), a keyboard, a television, a remote control, a monitor, a handheld multi-media device, a handheld media (audio and or video) player, a handheld gaming device, a signature input device for point of sale transactions, an eBook reader, medical instruments, warehouse tracking devices, such as scanners used by shipping companies, automotive devices, such as car keys and electronic devices within a vehicle, global position system ("GPS") or a control panel. Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and or alternating manner. The terms "first," "second," "third," "fourth," etc. as used herein are meant as labels to distinguish among different elements and may not necessarily have an ordinal meaning according to their numerical designation. As used herein, the term "coupled" may mean connected directly or indirectly through one or more intervening components. Any of the signals provided over various buses described herein may be time multiplexed with other signals and provided over one or more common on-die buses. Additionally, the interconnection and interfaces between circuit components or blocks may be shown as buses or as single signal lines. Each of the buses may alternatively be one or more single signal lines and each of the single signal lines may alternatively be buses.

The above description sets forth numerous specific details such as examples of specific systems, components, methods, and so forth, in order to provide an understanding of several embodiments of the present invention. It may be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth are merely exemplary. Particular implementations may vary from these exemplary details and still be contemplated to be within the scope of the present embodiments.

Embodiments of the claimed subject matter include, but are not limited to, various operations described herein. These operations may be performed by hardware components, software, firmware, or a combination thereof.

The above description sets forth numerous specific details such as examples of specific systems, components, methods, and so forth, in order to provide an understanding of several embodiments of the claimed subject matter. It may be apparent to one skilled in the art, however, that at least some embodiments of the method may be practiced without these specific details. In other instances, well-known components or methods are not described in detail or are presented in simple block diagram format. Thus, the specific details set forth are merely exemplary. Particular implementations may vary from these exemplary details and still be contemplated to be within the scope of the claimed subject matter.

What is claimed is:

1. A method, comprising:
   receiving, by a processing device, a plurality of radio frequency (RF) signal power measurements by a plurality of antenna elements at a plurality of RF channels;
   computing, by the processing device applying a first machine learning model to the plurality of RF signal power measurements, an estimated RF signal parameter value;
   responsive to determining that an estimated error value exceeds a predetermined threshold, re-computing the estimated RF signal parameter value by applying a second machine learning model, wherein the second machine learning model corresponds to a larger number of RF signal multi-paths than the first machine learning model; and
   outputting, by the processing device, the estimated RF signal parameter value.

2. The method of claim 1, wherein the plurality of RF signal power measurements includes a plurality of RF signal magnitude values and a plurality of RF signal phase values.

3. The method of claim 1, wherein the RF signal parameter value is one of: a line-of-sight (LoS) angle-of-arrival (AoA), a reflection AoA, an attenuation of reflection, a relative delay of reflection, or a relative phase.

4. The method of claim 1, wherein the first machine learning model performs a feature extraction to transform the plurality of RF signal power measurements to an intermediate representation in a reduced-dimension space.

5. The method of claim 4, wherein the first machine learning model performs a regression task to infer the estimated RF signal parameter value from the intermediate representation in the reduced-dimension space.

6. The method of claim 1, further comprising:
   training the first machine learning model by processing a training data set comprising a second plurality of RF signal power measurements by a second plurality of antenna elements at a second plurality of RF channels, wherein the RF signal power measurements are labeled with corresponding RF signal parameter values.

7. The method of claim 1, wherein the first machine learning model is a neural network, and wherein receiving the plurality of RF signal power measurements and applying the first machine learning model is performed iteratively until the estimated error value falls below the predetermined threshold.

8. A system comprising:
   a transceiver configured to couple to an antenna comprising a plurality of antenna elements to receive a plurality of radio frequency (RF) signal power measurements at a plurality of frequency channels; and
   a processor coupled to the transceiver, the processor to:
      select a machine learning model from a sequence of machine learning models, wherein a first machine learning model of the sequence has been trained on a first training data set produced in a first signal propagation environment that includes a first number of signal paths, wherein a second machine learning model of the sequence has been trained on a second training data set produced in a second signal propagation environment that includes a second number of signal paths, and wherein the second number of signal paths exceeds the first number of signal paths;
      compute, by applying the selected machine learning model to the plurality of RF signal measurements, an estimated RF signal parameter value; and responsive to determining that a parameter estimation error is less than or equal a predetermined error threshold value, output the estimated RF signal parameter value.

9. The system of claim 8, wherein the processor is further to:
responsive to determining that the parameter estimation error exceeds the predetermined error threshold value, iteratively repeat the selecting and computing operations until the estimated RF signal parameter value falls below the predetermined error threshold value.

10. The system of claim 8, wherein the plurality of RF signal power measurements includes a plurality of RF signal magnitude values and a plurality of RF signal phase values.

11. The system of claim 8, wherein the RF signal parameter value is one of: a line-of-sight (LoS) angle-of-arrival (AoA), a reflection AoA, an attenuation of reflection, a relative delay of reflection, or a relative phase.

12. The system of claim 8, wherein each machine learning model of the sequence of machine learning models performs a feature extraction to transform the plurality of RF signal power measurements to an intermediate representation in a reduced-dimension space.

13. The system of claim 12, wherein the machine learning model performs a regression task to infer the estimated RF signal parameter value from the intermediate representation in the reduced-dimension space.

14. A device comprising:
a transceiver configured to couple to an antenna comprising a plurality of antenna elements to receive a plurality of radio frequency (RF) signal power measurements at a plurality of frequency channels at a plurality of RF channels; and
a processor coupled to the transceiver, the processor to:
compute, by applying a first machine learning model to the plurality of RF signal measurements at the plurality of RF channels, an estimated RF signal parameter value;
responsive to determining that an estimated error value exceeds a predetermined threshold, re-compute the estimated RF signal parameter value by applying a second machine learning model, wherein the second machine learning model corresponds to a larger number of RF signal multi-paths than the first machine learning model; and
responsive to determining that a parameter estimation error is less than or equal a predetermined error threshold value, output the estimated RF signal parameter value.

15. The device of claim 14, wherein the processor is further to:
responsive to determining that the parameter estimation error exceeds the predetermined error threshold value, repeat the computing operation for the next plurality of RF signal measurements received at a different set of RF channels.

16. The device of claim 14, wherein the plurality of RF signal power measurements includes a plurality of RF signal magnitude values and a plurality of RF signal phase values.

17. The device of claim 14, wherein the RF signal parameter value is one of: a line-of-sight (LoS) angle-of-arrival (AoA), a reflection AoA, an attenuation of reflection, a relative delay of reflection, or a relative phase.

18. The device of claim 14, wherein the first machine learning model performs a feature extraction to transform the plurality of RF signal power measurements to an intermediate representation in a reduced-dimension space.

19. The device of claim 18, wherein the first machine learning model performs a regression task to infer the estimated RF signal parameter value from the intermediate representation in the reduced-dimension space.

\* \* \* \* \*